United States Patent
Sheinfeld

(10) Patent No.: US 10,033,737 B2
(45) Date of Patent: Jul. 24, 2018

(54) SYSTEM AND METHOD FOR CROSS-CLOUD IDENTITY MATCHING

(71) Applicant: Mainsoft R&D Ltd., Lod (IL)

(72) Inventor: Roy Sheinfeld, Tel Aviv (IL)

(73) Assignee: HARMON.IE R&D LTD., Lod (IL)

( * ) Notice: Subject to any disclaimer, the term of this patent is extended or adjusted under 35 U.S.C. 154(b) by 0 days.

(21) Appl. No.: 14/508,325

(22) Filed: Oct. 7, 2014

(65) Prior Publication Data

US 2015/0106899 A1 Apr. 16, 2015

Related U.S. Application Data

(60) Provisional application No. 61/889,100, filed on Oct. 10, 2013.

(51) Int. Cl.
*H04L 29/06* (2006.01)

(52) U.S. Cl.
CPC .................................. *H04L 63/10* (2013.01)

(58) Field of Classification Search
CPC ...................................................... H04L 63/10
USPC .......... 726/1, 2, 4, 8, 26, 27, 14, 23, 28, 6, 9
See application file for complete search history.

(56) References Cited

U.S. PATENT DOCUMENTS

| | | |
|---|---|---|
| 7,461,061 B2 | 12/2008 | Aravamudan et al. |
| 7,529,741 B2 | 5/2009 | Aravamudan et al. |
| 7,565,383 B2 | 7/2009 | Gebhart et al. |
| 7,599,925 B2 | 10/2009 | Larson et al. |
| 7,792,815 B2 | 9/2010 | Aravamudan et al. |
| 7,797,298 B2 | 9/2010 | Sareen et al. |
| 7,958,141 B2 | 6/2011 | Sundaresan et al. |
| 8,032,666 B2 | 10/2011 | Srinivansan et al. |
| 8,073,860 B2 | 12/2011 | Venkataraman et al. |
| 8,086,604 B2 | 12/2011 | Arrouye et al. |
| 8,131,745 B1* | 3/2012 | Hoffman ............. G06Q 10/107 707/766 |
| 8,271,334 B1* | 9/2012 | Funk .................. G06Q 30/0639 705/14.11 |
| 8,560,954 B1* | 10/2013 | Nakajima ............. G06Q 10/10 715/753 |
| 8,769,083 B2* | 7/2014 | Ferris ................... G06F 11/3419 705/34 |
| 8,789,157 B2* | 7/2014 | Sinn ....................... H04L 67/10 726/7 |
| 8,806,652 B2* | 8/2014 | Bjones ................ G06F 21/6263 713/193 |

(Continued)

*Primary Examiner* — David García Cervetti

(74) *Attorney, Agent, or Firm* — M&B IP Analysts, LLC

(57) ABSTRACT

A system and method for cross-cloud identity matching are provided. The method includes receiving at least one user identifier of a user of a client node; determining at least one cloud-based resource accessed by the client node; selecting a cloud-based resource of the at least one accessed cloud-based resource; extracting at least one possible user identity of the user from the selected cloud-based resource; identifying at least one user identifier of the extracted at least one possible user identity; matching between each identified user identifier and the at least one received user identifier; determining whether each possible user identity is associated with the user respective of the matching; and upon determining that at least one possible user identity is associated with the user, storing each associated user identity respective of the client node.

18 Claims, 3 Drawing Sheets

(56) References Cited

U.S. PATENT DOCUMENTS

| | | | |
|---|---|---|---|
| 8,813,249 B2* | 8/2014 | Gu | G06F 21/6218 726/28 |
| 8,984,588 B2* | 3/2015 | Otranen | H04L 63/08 713/168 |
| 9,203,837 B2* | 12/2015 | Pierson | H04L 63/08 |
| 9,215,683 B1* | 12/2015 | Tonogai | H04W 60/005 |
| 9,241,620 B1* | 1/2016 | Kockan | A61B 3/0033 |
| 9,325,714 B2* | 4/2016 | Tripunitara | H04L 63/101 |
| 9,361,392 B1* | 6/2016 | Saylor | G06F 17/3089 |
| 9,413,710 B1* | 8/2016 | Saylor | H04L 65/403 |
| 9,858,601 B2* | 1/2018 | Chand | G06Q 30/0269 |
| 2003/0163733 A1* | 8/2003 | Barriga-Caceres | G06F 21/33 726/5 |
| 2004/0111515 A1* | 6/2004 | Manion | H04L 29/12009 709/227 |
| 2004/0186989 A1 | 9/2004 | Clapper | |
| 2004/0260622 A1* | 12/2004 | Chan | G06Q 10/10 705/26.1 |
| 2007/0025547 A1* | 2/2007 | Segal | H04M 3/4872 379/399.01 |
| 2007/0061590 A1* | 3/2007 | Boye | G06F 21/305 713/186 |
| 2007/0112739 A1 | 5/2007 | Burns et al. | |
| 2007/0124226 A1* | 5/2007 | Garner, Jr. | G06Q 40/00 705/35 |
| 2007/0143860 A1* | 6/2007 | Hardt | G06F 21/6254 726/28 |
| 2008/0209339 A1* | 8/2008 | Macadaan | G06F 3/0482 715/745 |
| 2008/0222105 A1* | 9/2008 | Matheny | G06F 17/30867 |
| 2009/0030747 A1* | 1/2009 | Smith | G06Q 10/02 705/5 |
| 2009/0125521 A1* | 5/2009 | Petty | G06F 21/6263 |
| 2009/0133110 A1* | 5/2009 | Kumar | H04L 29/12122 726/8 |
| 2009/0209236 A1* | 8/2009 | Bloebaum | G06N 3/006 455/414.1 |
| 2009/0300152 A1* | 12/2009 | Ferris | G06F 9/5072 709/223 |
| 2010/0094854 A1 | 4/2010 | Rouhani-Kalleh | |
| 2010/0194896 A1* | 8/2010 | Heimendinger | H04N 1/00132 348/207.1 |
| 2010/0274815 A1* | 10/2010 | Vanasco | G06F 17/30867 707/798 |
| 2011/0055909 A1* | 3/2011 | Dowlatkhah | G06F 21/31 726/6 |
| 2011/0066707 A1* | 3/2011 | Brunson | H04L 29/12122 709/221 |
| 2011/0087732 A1* | 4/2011 | Lakshmanan | H04L 67/303 709/204 |
| 2011/0125770 A1* | 5/2011 | Battestini | G06Q 10/00 707/758 |
| 2011/0131205 A1 | 6/2011 | Iyer et al. | |
| 2011/0208783 A1* | 8/2011 | Dolphin | G06Q 10/06 707/800 |
| 2011/0265147 A1* | 10/2011 | Liu | H04L 63/08 726/4 |
| 2011/0270995 A1* | 11/2011 | Mutikainen | H04L 29/12584 709/227 |
| 2012/0017094 A1* | 1/2012 | Tulchinsky | G06F 21/6263 713/182 |
| 2012/0023556 A1* | 1/2012 | Schultz | G06F 21/41 726/4 |
| 2012/0124202 A1* | 5/2012 | Cooper | G06F 17/30035 709/224 |
| 2012/0155776 A1* | 6/2012 | Zen | G06F 17/30277 382/197 |
| 2012/0166533 A1* | 6/2012 | Rubinstein | G06Q 50/01 709/204 |
| 2012/0166553 A1* | 6/2012 | Rubinstein | G06Q 50/01 709/206 |
| 2012/0271860 A1* | 10/2012 | Graham, Jr. | G06Q 30/02 707/798 |
| 2012/0278176 A1* | 11/2012 | Naor | G06Q 30/0207 705/14.66 |
| 2012/0296965 A1* | 11/2012 | Srivastava | G06Q 50/01 709/204 |
| 2012/0317217 A1* | 12/2012 | Lavy | G06Q 10/10 709/206 |
| 2012/0323959 A1* | 12/2012 | O'Sullivan | G06Q 10/107 707/769 |
| 2013/0124229 A1* | 5/2013 | Cashman | G06Q 40/08 705/4 |
| 2013/0159333 A1* | 6/2013 | Assam | G06F 17/30386 707/758 |
| 2013/0173457 A1* | 7/2013 | Chrapko | G06Q 40/02 705/39 |
| 2013/0226711 A1* | 8/2013 | Wu | G06Q 30/02 705/14.69 |
| 2013/0239019 A1* | 9/2013 | Pike | H04L 51/04 715/753 |
| 2013/0297425 A1* | 11/2013 | Wallaja | G06Q 20/4014 705/14.64 |
| 2013/0326600 A1* | 12/2013 | Sorek | G06Q 20/4016 726/6 |
| 2013/0339141 A1* | 12/2013 | Stibel | G06F 21/31 705/14.49 |
| 2014/0095320 A1* | 4/2014 | Sivaramakrishnan | H04L 67/22 705/14.66 |
| 2014/0122473 A1* | 5/2014 | Fletcher | G06Q 10/101 707/732 |
| 2014/0122697 A1* | 5/2014 | Liu | G06F 17/30867 709/224 |
| 2014/0136333 A1* | 5/2014 | Shoshitaishvili | G06Q 30/0269 705/14.66 |
| 2014/0137110 A1* | 5/2014 | Engle | G06F 9/5022 718/1 |
| 2014/0137226 A1* | 5/2014 | Han | G06F 21/41 726/8 |
| 2014/0164352 A1* | 6/2014 | Denninghoff | H03H 9/02622 707/711 |
| 2014/0201048 A1* | 7/2014 | Lin | G06Q 30/0185 705/35 |
| 2014/0229273 A1* | 8/2014 | Garcia-Martinez | G06Q 30/0275 705/14.46 |
| 2014/0237028 A1* | 8/2014 | Messenger | G06Q 30/02 709/203 |
| 2014/0237563 A1* | 8/2014 | Zhang | H04L 63/083 726/5 |
| 2014/0325379 A1* | 10/2014 | McDevitt | G06F 9/526 715/746 |
| 2014/0351157 A1* | 11/2014 | Kapoor | G09B 7/02 705/326 |
| 2015/0012433 A1* | 1/2015 | Yang | G06Q 20/227 705/44 |
| 2015/0020148 A1* | 1/2015 | Greenbaum | G06F 21/33 726/1 |
| 2015/0036004 A1* | 2/2015 | Harwell | G06F 3/0481 348/207.11 |
| 2015/0082404 A1* | 3/2015 | Goldstein | G10L 17/00 726/7 |
| 2015/0213542 A1* | 7/2015 | Wallaja | G06Q 30/0635 705/14.55 |
| 2015/0254723 A1* | 9/2015 | Chand | G06Q 30/0269 705/14.66 |
| 2015/0256633 A1* | 9/2015 | Chand | G06K 9/00536 382/103 |
| 2015/0356180 A1* | 12/2015 | Filiz | G06Q 50/01 707/734 |
| 2016/0034712 A1* | 2/2016 | Patton | G06F 21/6245 726/28 |
| 2016/0055159 A1* | 2/2016 | Connolly | G06F 17/3053 707/734 |

* cited by examiner

SYSTEM AND METHOD FOR CROSS-CLOUD IDENTITY MATCHING

CROSS-REFERENCE TO RELATED APPLICATIONS

This application claims the benefit of U.S. Provisional Application No. 61/889,100 filed on Oct. 10, 2013, the contents of which are hereby incorporated by reference.

TECHNICAL FIELD

The present invention relates generally to identifying cloud sources accessed by a user device over the web, and more particularly to systems and methods for providing content from cloud sources accessed by a user device.

BACKGROUND

As a growing number of organizations are adopting cloud-based solutions provided by different vendors, it is becomingly increasingly common for an enterprise's information technology (IT) landscape to be an environment composed of multiple cloud ecosystems. Each cloud-based solution carries its own technological stack, which exposes a solution-dependent user experience and a specific set of tools that help IT administrators control and manage the use of these cloud services.

By their nature, cloud-based systems are run in an isolated environment, requiring implementation of corresponding user management tools for each system. These tools are not typically shared between cloud-based systems. As a result, silos develop, thereby requiring users to maintain multiple identities for multiple cloud services. Since user identity management is proprietary to each of these systems, different sets of profile attributes and information are exposed while a user interacts with the systems' respective application program interfaces.

Users may wish to be able to efficiently switch between their identities. In particular, when a user is originally using one cloud-based system and wishes to temporarily switch to using another cloud-based system, the user may wish to access the tools of the temporary cloud-based system while remaining able to access the tools of the original cloud-based system. Further, it may be desirable to access information regarding a user from multiple cloud-based resources simultaneously. For example, when viewing a profile of a sales person, a user may wish to view both the sales person's latest sales activity (streamed from, e.g., Salesforce®) as well as the most recent document provided by the sales person (streamed from, e.g., Office 365). Since these cloud systems do not share a common user identity, it is difficult to match identities across cloud platforms.

It would therefore be advantageous to provide a solution that would overcome the deficiencies of the prior art by identifying the user identities through a plurality of cloud-based systems.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosure relates in various embodiments to a method for cross-cloud identity matching. The method comprises receiving at least one user identifier of a user of a client node; determining at least one cloud-based resource accessed by the client node; selecting a cloud-based resource of the at least one accessed cloud-based resource; extracting at least one possible user identity of the user from the selected cloud-based resource; identifying at least one user identifier of the extracted at least one possible user identity; matching between each identified user identifier and the at least one received user identifier; determining whether each possible user identity is associated with the user respective of the matching; and upon determining that at least one possible user identity is associated with the user, storing each associated user identity respective of the client node.

The disclosure relates in various embodiments to a system for cross-cloud identity matching. The system includes a processing system; and a memory communicatively connected to the processing system, the memory containing instructions that, when executed by the processing system, configure the system to: receive at least one user identifier of a user of a client node; determine at least one cloud-based resource accessed by the client node; select a cloud-based resource of the at least one accessed cloud-based resource; extract at least one possible user identity of the user from the selected cloud-based resource; identify at least one user identifier of the extracted at least one possible user identity; match between each identified user identifier and the at least one received user identifier; determine whether each possible user identity is associated with the user respective of the matching; and upon determining that at least one possible user identity is associated with the user, store each associated user identity respective of the client node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
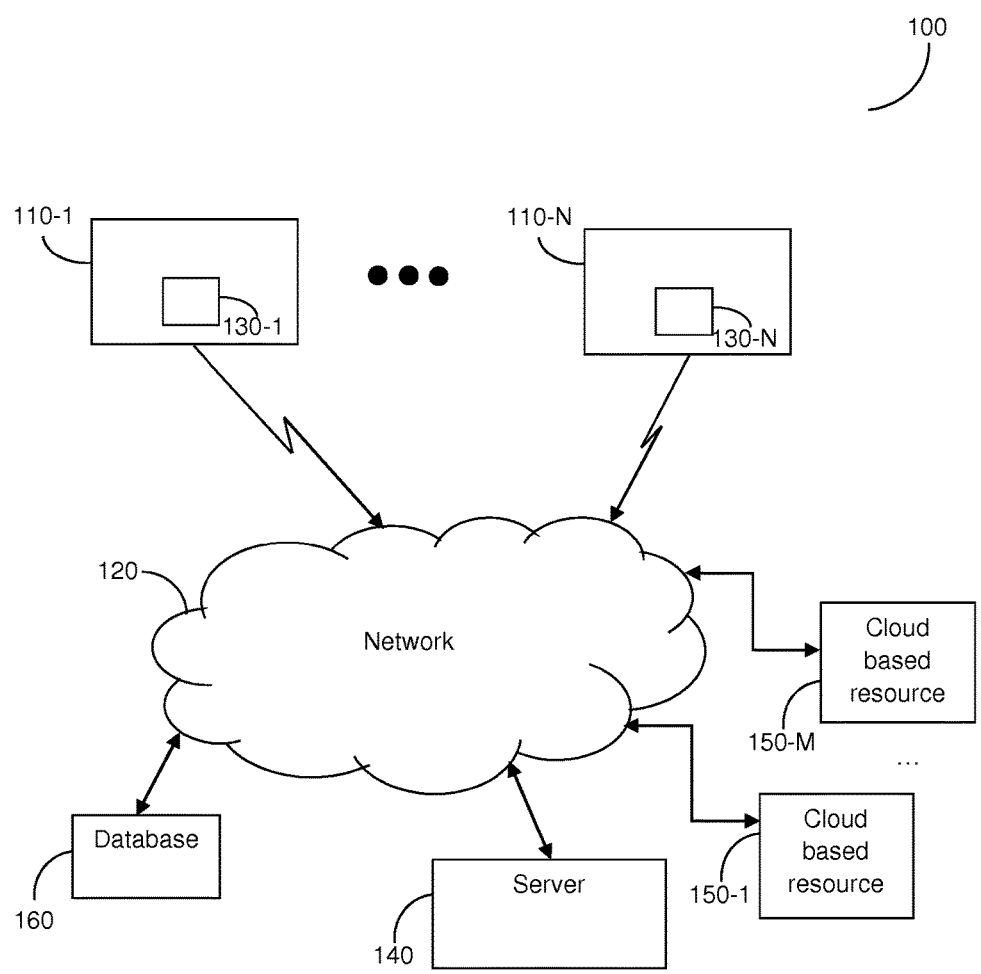
FIG. 1 is a schematic block diagram of a system for cross-cloud identity matching according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for cross-cloud identity matching. A user identity is identified through a plurality of cloud-based resources. In an exemplary embodiment, parameters related to a user are received. Then, a plurality of cloud-based resources is analyzed and one or more possible user identities are extracted from each cloud-based resource of the plurality of cloud-based resources. As a result of matching between the extracted user identities and the received parameters related to the user, the user identity may be determined through each of the plurality of cloud-based resources. In an embodiment, respective of the identification of a user's identities, content related to the user's identities is extracted and displayed.

FIG. 1 shows an exemplary and non-limiting schematic block diagram of a network system 100 utilized to describe the various disclosed embodiments. A plurality of client nodes 110-1 through 110-N (hereinafter referred to collectively as client nodes 110 and individually as a client node 110, merely for simplicity purposes) are communicatively connected to a network 120. Each of the client nodes 110-1 through 110-N may be, but is not limited to, a personal computer, a tablet computer, a laptop computer, a wearable computing device, a smart phone, and so on. The network 120 may be, but is not limited to, a wireless network, a cellular network, a wired network, a local area network (LAN), a wide area network (WAN), a metro area network (MAN), the Internet, the worldwide web (WWW), and a combination thereof.

The network system 100 further comprises agents 130-1 through 130-N (hereinafter referred to collectively as agents 130 or individually as an agent 130, merely for simplicity purposes) respectively installed in the client nodes 110-1 through 110-N. Each of the agents 130 may be implemented as an application program having instructions that may reside in a memory of its respective client node. Each agent 130 is further communicatively connected to a server 140 over the network 120.

According to one embodiment, each agent 130 is configured to monitor a plurality of cloud-based resources 150-1 through 150-M (hereinafter referred to collectively as cloud-based resources 150 or individually as a cloud-based resource 150, merely for simplicity purposes) accessed by or through the respective client node 110. The cloud-based resources 150 may include, but are not limited to, social networks, enterprise networks, chat applications, and so on, which the client node 110 communicates with. Each agent 130 is further configured to collect user identifiers related to the user of its respective client node 110.

The user identifiers may be personal or professional parameters related to the user. Personal parameters may be, but are not limited to, a user's name (first, middle, and/or last), age, gender, hobbies, hometown, personal contacts, and so on. Professional parameters may be, but are not limited to, the user's profession, the type of work the user typically performs, a title of the user, a department within a company, free text (e.g., an "AboutMe" text that explains the user's experience), skills, professional contacts a phone number, the location of the user's place of work, and so on. The user identifiers may further include profile pictures associated with a user identity of a cloud-based resource.

The identifiers collected by each agent 130 are sent to the server 140. The server 140 is configured to identify, based on the identifiers, one or more cloud-based resources of the cloud-based resources 150 which the user accessed through the client node as well as the user identity respective of each cloud-based resource 150. Respective of each user identity, the server 140 is further configured to collect or receive the data viewed by the user through each cloud-based resource 150.

It should be noted that, in certain cloud-based resources of the cloud-based resources 150, email addresses or unique identifiers may be used to determine search queries for determination of user identities. When unique identifiers are used to determine search queries, the server 140 is configured to tokenize and partition the user identifiers, and uses one or more of the partitioned and/or tokenized identifiers as search queries. For example, when a user's full name is identified, the full name may be partitioned into portions such as, e.g., a first name and a surname. Each portion of the full name may be joined with other identifiers such as, but not limited to, the user's profession. The joined identifiers may then be used as a search query.

As a non-limiting example, when one cloud-based resource of the cloud-based resources 150 is Google+®, a user's Gmail® email address may be used as a search query. As another non-limiting example, if the cloud-based resource is Salesforce®, the email addresses related to the users' profiles are not exposed. Thus, in this example, a full name and profession of the user may be used to determine a search query. If the user's full name is John Smith and his profession is identified as a lawyer, the queries "smith" and "lawyer" may be jointly used as a search query. The search results provided in response to this query may be ranked in order of degree of matching based on other identifiers included within the search results and the use identifiers.

According to another embodiment, profile photos related to a user's profile on a cloud-based resource 150 may further be used by the server 140 to determine a user's identity. In this embodiment, image processing, image tagging, and/or face detection techniques may be performed on profile photos related to possible users' identities in order to determine a match. As a non-limiting example, a user may have a photo associated with his Google+® account. This photo may be analyzed and compared to photos of users on other cloud-based resources 150 to identify appearance of that user in photos associated with other cloud-based resources. The server 140 configured some of the disclosed embodiments include a processing system (not shown) that is coupled to a memory (not shown), and optionally a network interface (not shown). The processing system is connected to the memory, which typically contains instructions that can be executed by the processing system. The processing system of the server 140 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Figure 2:
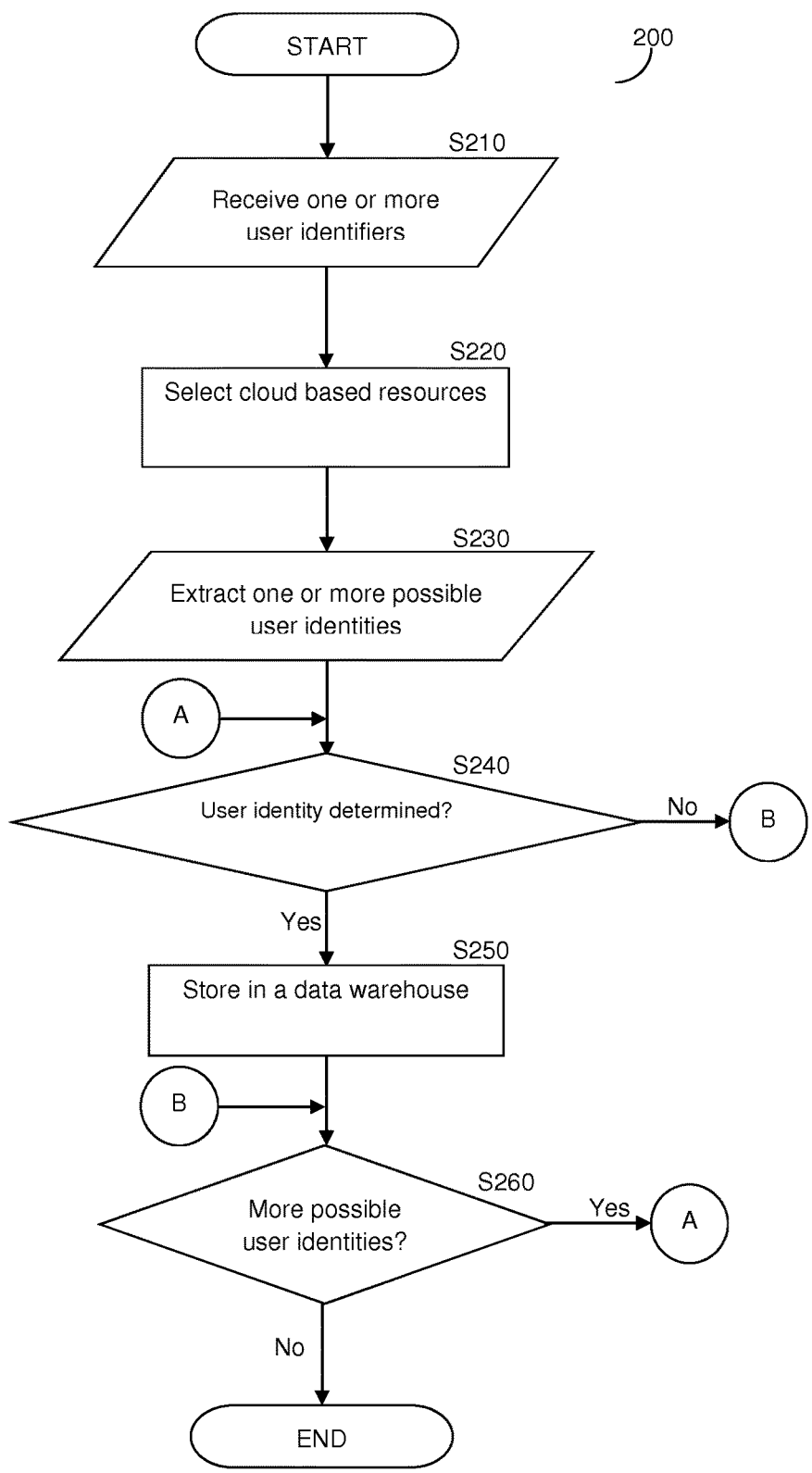
FIG. 2 is a flowchart illustrating cross-cloud identity matching according to an embodiment.

FIG. 2 depicts an exemplary and non-limiting flowchart 200 illustrating cross-cloud identity matching according to one embodiment. In S210, at least one user identifier is received from an agent installed on a client node (e.g., the client node 110-1). In S220, at least one cloud-based resource (e.g., cloud-based resource 150-1) is selected. The selection may be based on a determination that a user has accessed a particular cloud-based resource. This determination may occur if, e.g., content identified through a client node indicates that a user accessed a particular cloud-based resource. For example, if content identified through a client node indicates that the user has accessed Microsoft Inc., Microsoft Enterprise's network is selected.

In S230, the selected cloud-based resources are analyzed and at least one possible user identity is extracted from the selected cloud-based resources. In S240, it is checked if at least one of the at least one possible user identity has been determined to be a user identity associated with the user and, if so, execution continues with S250; otherwise, execution continues with S260. A user identity that is associated with a user may be, but is not limited to, a user identity that the user has previously accessed via the client node or another device. Determining whether a possible user identity is a user identity associated with the user is described further herein below with respect to FIG. 3.

In S250, the at least one possible user identity that is associated with the user is identified as a user identity of the user and stored in a data warehouse. In S260, it is checked if additional possible user identities have been identified and, if so, execution continues with S240; otherwise, execution terminates.

As a non-limiting example, a full name of the user is received from an agent installed on a client node. In this example, the received full name is "John Smith." Based on content contained in the client node, it is determined that the user has accessed Google+®. As a result, the cloud-based resource owned by Google® is selected. The Google® cloud-based resource is analyzed and a plurality of user identities are identified. In this example, the identified user identities are Google+® accounts owned by a variety of users.

User identifiers extracted from the identified user identities are matched to the full name "John Smith." Based on this matching, it is determined that a Google+® account with the name "John Smith" is associated with the user. This Google+® account is stored in a database for subsequent use by the user.

Figure 3:
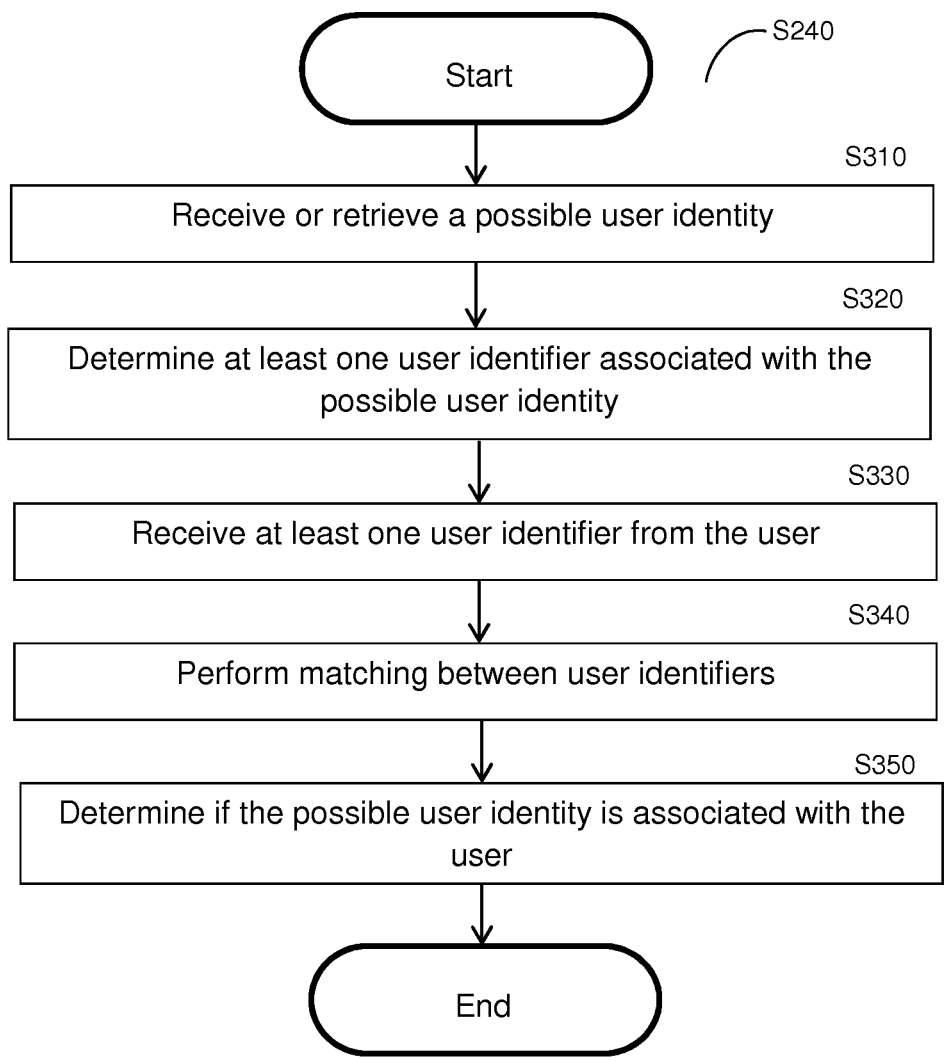
FIG. 3 is a flowchart illustrating determining whether a possible user identity is associated with a user according to an embodiment.

FIG. 3 is an exemplary and non-limiting flowchart S240 illustrating determining whether a possible user identity is a user identity associated with a user according to one embodiment. In S310, a possible user identity is received or retrieved. In S320, at least one user identifier associated with the possible user identity is determined. The user identifiers may be personal or professional parameters related to the user, or an email address associated with the user. Personal parameters may be, but are not limited to, a user's name, age, gender, hobbies, hometown, and so on. Professional parameters may be, but are not limited to, the user's profession, the type of work the user typically performs, the location of the user's place of work, and so on. In an embodiment, the at least one user identifier may include profile photos related to the user identity may be determined in addition to or in place of the user identifiers.

In S330, at least one user identifier is received from the user. In an embodiment, the at least one received user identifier may be received from an agent installed on a client device operated by the user. In another embodiment, the at least one user identifier may further include profile photos related to the user identity. In S340, matching is performed between the at least one user identifier associated with the possible user identity and the at least one user identifier received from the user.

In S350, respective of the matching between user identifiers, it is determined if the possible user identity is associated with the user. In an embodiment, the determination is based on a predetermined verification threshold. In that embodiment, the possible user identity is determined to be associated with the user when the user identifiers demonstrate matching above the verification threshold. A verification threshold may be, for example, a number of user identifiers associated with the possible user identity that are identical or substantially similar to user identifiers received from the user. Substantially similar user identifiers may be, for example, user identifiers that demonstrate matching above a predefined matching threshold. In an embodiment, the verification threshold may be a degree of matching between user identifiers. In various embodiments, possible user identities may be ranked such that possible user identities with user identifiers that far exceed the verification threshold are ranked higher than possible user identities that just barely exceed the verification threshold.

Typically, when one of the user identifiers is a full name, the verification threshold will require that at least two user identifiers be identical or substantially similar to determine an association between the possible user identity and the user. This requirement is often used because many users may share full names. As an example, many users may share the relatively common name "John Smith." Thus, full name may not provide clear identification of a single user's identities.

In an embodiment, determining a degree of matching may involve identifying the intersection between two user identifiers. In that embodiment, degrees of matching are typically found to be higher when the user identifiers share special terms as well as common terms rather than just common terms. A special term may be, e.g., a company name, a particular field of technology or business, a job title, and so on. A common term may be any term that tends to be common among profiles such as, but not limited to, "the," "officer," "research," a particular state name (e.g., New York, California, etc.), and so on.

In a further embodiment, if the number of user identities that are possible user identities associated with the user is above a predefined identity threshold, the verification threshold may be raised. As a non-limiting example, if the verification threshold is at least 3 user identifiers that are identical or substantially similar, and the number of identified potential user identities associated with user identifiers that are identical or substantially similar is above 1000 users, the verification threshold may be raised to at least 4 user identifiers that are identical or substantially similar.

In an embodiment, a degree of matching between profile photos that is above a predetermined matching threshold may yield a determination that the profile photos are substantially similar. As a non-limiting example, if the profile photos demonstrate matching above the photo matching threshold and no other user identifiers match, the number of user identifiers that are identical and/or substantially similar is determined to be 1.

In another embodiment, determining if the possible user identity is associated with the user may further include prompting the user for confirmation that the possible user identity is a user identity of the user. In that embodiment, if the user does not confirm that the possible user identity is associated with the user, another possible user identity that passes the verification threshold may be provided to the user. In a further embodiment, the other possible user identity that is provided may be the next highest ranked user identity.

As a non-limiting example, a possible user identity is received. Respective thereto, a user identifier associated with the possible user identity is identified. In this example, the identified user identifier is a profile photo of the user. A profile photo is also received from the user. Matching is performed between the received profile photo and the identified profile photo using image recognition techniques. It is determined that the degree of matching between the profile photos determined by the image recognition techniques is above a predefined verification threshold and, as a result, it is determined that the possible user identity is associated with the user.

As another non-limiting example, a possible user identity is received. Respective thereto, user identifiers associated with the possible user identity are identified. In this example, the identified user identifiers are a full name and a profession of the user. Additionally, the verification threshold is at least 2 user identifiers in common. The full name is "Peter Parker" and the profession is "journalist." A full name and a profession of the user are received from the user. The full names and professions are identical. Thus, it is determined that the received user identity meets the predefined verification threshold because at least two user identifiers were in common and, as a result, it is determined that the possible user identity is associated with the user.

In an embodiment, the processes described with reference to FIGS. 2 and 3 may be performed by the server 140.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, implemented by one or more computers of a computer-based cloud environment in which there are implemented a plurality of cloud-based resources for at least two of which a user has a user identity, for cross-cloud identity matching, comprising:
    receiving at least one user identifier of a user of a client node;
    determining at least one of the cloud-based resources accessed by the client node;
    selecting a cloud-based resource of the determined at least one cloud-based resource;
    extracting at least one possible user identity of the user from the selected cloud-based resource;
    identifying at least one user identifier of the extracted at least one possible user identity;
    wherein one of the at least one received user identifier and one of the at least one identified user identifier is a profile photo;
    matching between each identified user identifier and the at least one received user identifier;
    determining whether each possible user identity is associated with the user based on the matching; and
    upon determining that at least one possible user identity is associated with the user, storing each associated user identity for the client node.

2. The method of claim 1, wherein the at least one user identifier is received from an agent installed on the client node.

3. The method of claim 1, wherein the at least one of the determined cloud-based resources was previously accessed but is not currently accessed by the client node.

4. The method of claim 1, wherein each of the at least one received user identifier and the at least one identified user identifier is any one of: a personal parameter, a professional parameter, an email address, and further wherein the personal parameter is any one of: a name, an age, a gender, a hobby, and a hometown and the professional parameter is any one of: a profession, a type of work, and a location of the user's work.

5. The method of claim 1, wherein a possible user identity is determined to be associated with the user upon determining that the matching at least one identified user identifier and the at least one received user identifier exceeds a verification threshold.

6. The method of claim 5, wherein the verification threshold is any one of: a number of user identifiers that demonstrate matching above a matching threshold, and a degree of matching between user identifiers.

7. The method of claim 1, wherein determining whether each possible user identity is associated with the user further comprises:
    providing each associated user identity to a user; and
    upon receiving a confirmation from the user that the associated user identity is associated with the user, determining that the associated user identity is associated with the user.

8. The method of claim 1, further comprising at least one of: tokenizing the received at least one user identifier and parsing the received at least one user identifier.

9. A non-transitory computer readable medium having stored thereon instructions for causing one or more processing units to execute the method according to claim 1.

10. A system, implemented by one or more computers of a computer-based cloud environment in which there are implemented a plurality of cloud cloud-based resources for at least two of which a user has a user identity, for cross-cloud identity matching, comprising:
    a processing system; and
    a memory communicatively connected to the processing system, the memory containing instructions that, when executed by the processing system, configure the system to:
        receive at least one user identifier of a user of a client node;
        determine at least one of the cloud-based resources accessed by the client node;

select a cloud-based resource of the determined at least one cloud-based resource;

extract at least one possible user identity of the user from the selected cloud-based resource;

identify at least one user identifier of the extracted at least one possible user identity;

wherein one of the at least one received user identifier and one of the at least one identified user identifier is a profile photo;

match between each identified user identifier and the at least one received user identifier;

determine whether each possible user identity is associated with the user based on the matching; and upon determining that at least one possible user identity is associated with the user, store each associated user identity for the client node.

11. The system of claim 10, wherein the at least one user identifier is received from an agent installed on the client node.

12. The system of claim 10, wherein the at least one of the determined cloud-based resources was previously accessed but is not currently accessed by the client node.

13. The system of claim 10, wherein each of the at least one received user identifier and the at least one identified user identifier is any one of: a personal parameter, a professional parameter, an email address, and further wherein the personal parameter is any one of: a name, an age, a gender, a hobby, and a hometown and the professional parameter is any one of: a profession, a type of work, and a location of the user's work.

14. The system of claim 10, wherein a possible user identity is determined to be associated with the user upon determining that the matching at least one identified user identifier and the at least one received user identifier exceeds a verification threshold.

15. The system of claim 14, wherein the verification threshold is any one of: a number of user identifiers that demonstrate matching above a matching threshold, and a degree of matching between user identifiers.

16. The system of claim 10, wherein the system is further configured to:

provide each associated user identity to a user; and upon receiving a confirmation from the user that the associated user identity is associated with the user, determine that the associated user identity is associated with the user.

17. The system of claim 10, wherein the system is further configured to perform at least one of: tokenize the received at least one user identifier, and parse the received at least one user identifier.

18. The system of claim 10, wherein the client node further comprises an agent configured to collect the at least one user identifier of the user of the client node.

* * * * *